United States Patent [19]
Glatt

[11] 3,818,605
[45] June 25, 1974

[54] APPARATUS FOR PRODUCING A FLUIDIZED BED AND FOR SPRAYING A FLUID UPON THE WHIRLING PARTICLES

[76] Inventor: Werner Glatt, 7859 Haltingen/Baden, Germany

[22] Filed: June 4, 1971

[21] Appl. No.: 149,913

[30] Foreign Application Priority Data
June 16, 1970 Switzerland.................. 9082/70

[52] U.S. Cl................................... 34/57 A, 432/58
[51] Int. Cl........................................... F26b 17/10
[58] Field of Search................... 34/10, 57 A, 57 R; 263/21 A; 432/15, 58

[56] References Cited
UNITED STATES PATENTS

| | | | |
|---|---|---|---|
| 2,069,193 | 1/1937 | Behr et al. | 34/10 X |
| 3,214,844 | 11/1965 | Oates et al. | 34/10 |
| 3,216,125 | 11/1965 | Dennert | 34/10 |
| 3,394,468 | 7/1968 | Zeller | 34/57 A |
| 3,436,837 | 4/1969 | Abelow et al. | 34/10 X |

Primary Examiner—William F. O'Dea
Assistant Examiner—William C. Anderson
Attorney, Agent, or Firm—Werner W. Kleeman

[57] ABSTRACT

An apparatus for producing a fluidized bed and for spraying a fluid medium upon the whirling particles, as well as for moistening and subsequent drying of granular material or the like as well as for coating particles, which comprises a container for the material to be treated. The container is constructed so that it is upwardly and inwardly inclined, in other words tapers towards the top thereof and possesses an apertured floor having mounted thereat a central cone-like projection or elevation. Atomizer nozzles for the fluid medium are provided at the apex of the cone-like projection, and a vertically extending chute or shaft merges with the top of the container. According to an important aspect of this development a substantially non-deformable yet elastic dome-shaped net which confines the fluidized bed is arranged over the container.

5 Claims, 1 Drawing Figure

PATENTED JUN 25 1974 3,818,605
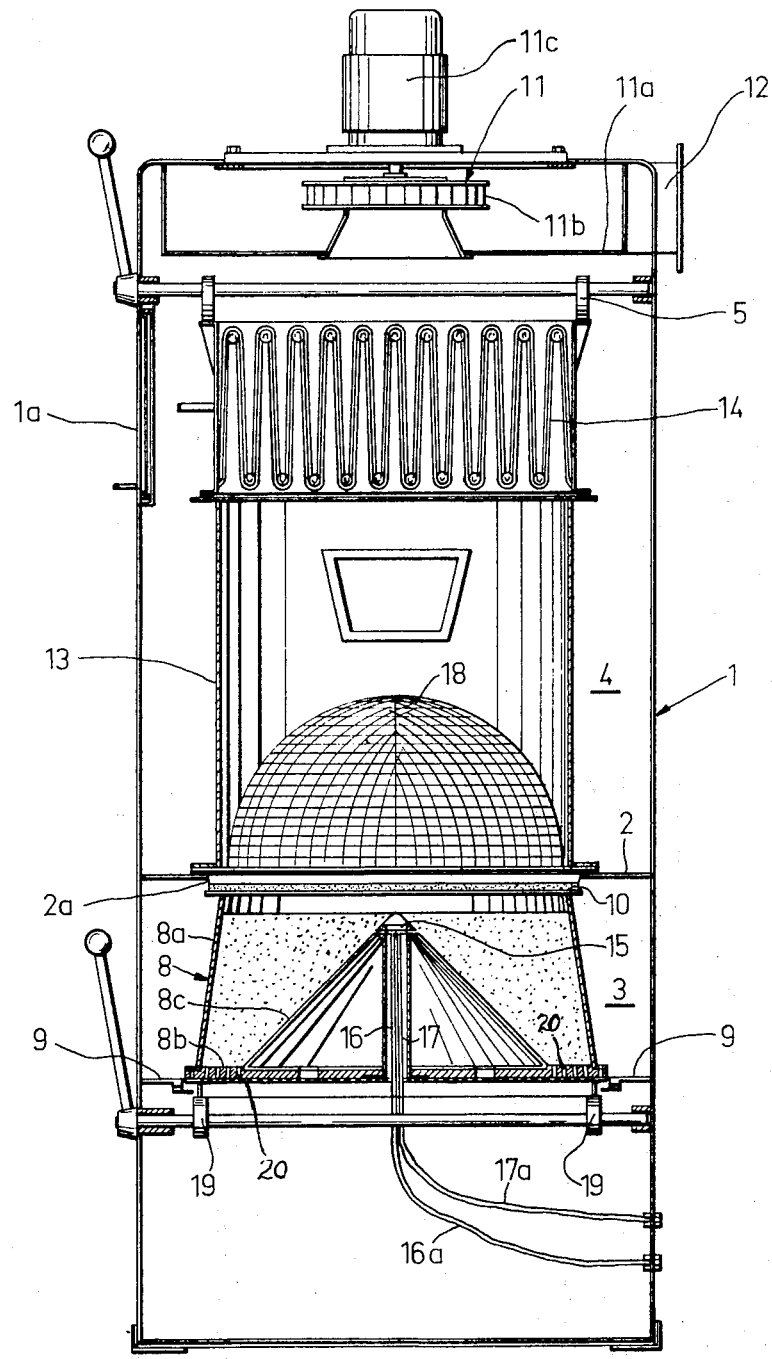
INVENTOR
HERNER GLATT
BY Werner W. Kleeman
ATTORNEY

APPARATUS FOR PRODUCING A FLUIDIZED BED AND FOR SPRAYING A FLUID UPON THE WHIRLING PARTICLES

BACKGROUND OF THE INVENTION

The present invention broadly pertains to treatment equipment for pulverulent or granular feed, and in its more specific aspects, relates to a new and improved apparatus for producing a fluidized bed and for spraying or coating a liquid upon the whirling particles to be treated.

The prior art is familiar with a vast number of different types of equipment for treating particles in a fluidized bed. One such state-of-the-art type equipment of this nature has been disclosed in U.S. Pat. No. 3,394,468, granted July 30, 1968, entitled "Container For The Reception Of a Pulverulent or Granular Feed For Treatment In a Hot Air Dryer," and which has been assigned to the inventor of this development. One particular form of apparatus disclosed in that patent and used for producing a fluidized bed and for coating or spraying a liquid onto the whirling particles, embodies a container for the material to be treated, this container tapering or narrowing towards its top and incorporating an apertured floor having a central cone-like projection mounted thereat. Furthermore, spray or atomizer nozzles are accommodated at the apex of the cone-like projection and a vertical shaft merges with the upper end of the container.

Equipment of this type can be used both for moistening and subsequent drying of granular material as well as for coating particles, in other words in accordance with the so-called film coating technique.

SUMMARY OF THE INVENTION

It is a primary object of the present invention to improve upon the above-discussed prior art equipment.

Another and more specific object of the present invention relates to an improved apparatus for producing a fluidized bed equipped with means affording a more protective environment for the particles undergoing treatment so as to prevent impact damage to such particles.

Still a further significant object of the present invention is the provision of improved apparatus of the character described which contains means for confining the fluidized bed and avoiding undesired impacts against hard surfaces of the equipment which might damage the feed undergoing treatment, and wherein the volume of the fluidized bed is confined in such a manner that there is provided a uniform density of the particles within the bed so that all particles are subjected to approximately the same path of travel, and in the case where the particles are to be coated affords improved economy in the use of the atomized coating material because of the confined nature of the fluidized bed while at the same time reducing the treatment times.

Now, in order to implement these and still further objects of the invention, which will become more readily apparent as the description proceeds, the treatment apparatus of the present invention and which is of the character described above is manifested by the features that a substantially non-deformable yet elastic, substantially dome-shaped net which confines the fluidized bed is arranged over the container. The provision of this net results in an improvement of the useful effect of the equipment and reduces the consumption of treatment liquid.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE illustrates a vertical sectional view through a preferred embodiment of the inventive apparatus.

DETAILED DESCRIPTION OF THE PREFERRED EMBODIMENT

Prior to discussing the exemplary embodiment of equipment in detail it is here to be briefly mentioned that only sufficient details of the actual physical construction thereof will be given hereinafter to enable one versed in the art to fully understand the underlying concepts of the present development. This is particularly so inasmuch as this invention is an improvement upon the construction of hot air dryer disclosed in the aforementioned U.S. Pat. No. 3,394,468 to which reference may be readily had as concerns individual details not particularly discussed herein. Thus, by now referring to the single FIGURE it will be seen that the dryer depicted therein comprises an outer casing 1 which is internally sub-divided by a horizontal extending intermediate floor or partition 2 into a lower compartment 3 and an upper compartment 4. The front of the entire outer casing 1 is provided with an airtight closable door which has not been particularly shown herein. Furthermore, at the region of the lower chamber or compartment 3 and specifically at the rear side thereof there is provided an air inlet opening which is not visible in the drawing and which opening is equipped with an air filter and a heater in a manner well known in this particular art. For the purpose of introducing the container 8 through the open door and for conveniently placing such at the desired location internally of the outer casing 1 there are provided the rail members 9 which can be conveniently attached in any suitable fashion to the inner wall of the outer casing 1. There are also provided a pair of cams or eccentrics 19 which enable raising the inserted container 8 from below against a seal member 10 which is located at the periphery of a central opening 2a provided at the intermediate floor or partition member 2. In this way there can be maintained a tight joint between the upper edge of the container 8 and the seal 10.

Now at the uppermost location within the upper chamber or compartment 4 there is arranged a blower or fan arrangement 11 embodying a housing 11a, an impeller wheel 11b, impeller wheel 11b being driven by any suitable drive motor 11c here shown located externally of the outer casing 1 at the top thereof. The purpose of the blower arrangement 11 is to withdraw air from the upper compartment 4 and to convey such into a discharge or exhaust pipe 12. Apart from the above described structure there is also arranged within the upper compartment 4 a connection housing 13 which forms a vertically extending shaft which rests upon the intermediate floor or partition 2. An exchangable exhaust air filter 14 rests upon this vertically extending shaft 13, as shown, and is maintained in this position by cams 5. When the fixing means embodying the cams or eccentrics 5 is released then the exhaust filter 14 can be removed from the casing or housing 1 through the upper door 1a.

Considering now details of the construction of the container 8 it will be seen that such possesses upwardly inclined or tapering walls 8a so as to impart to the container structure a cone-like or frusto-conical configuration wherein the container possesses a diameter at its base which is greater than at its top. Container 8 further embodies a perforated floor or bottom 8b at which there is erected a central cone-like projection or elevation 8c. Now at the apex of this cone-like projection 8c there are housed a number of, for instance two, three or four atomizer or spray nozzles 15 for a liquid which is to be atomized. In this regard, the arrangement of such spray nozzles and the construction of the container 8 itself is quite similar to the arrangement shown in FIG. 5 of the aforementioned U.S. Pat. No. 3,394,468. Additionally, conduits 16 and 17 are located centrally of the cone-like projection 8c and serve for the infeed of a desired fluid medium or media, such as a liquid or compressed air. These conduits 16 and 17 are connected by hoses 16a and 17a in such a manner with a respective conduit which is fixedly arranged within the casing 1 that it is possible to remove the container 8 from the interior of the housing 1, and with the hose connections released, to transport such container away from such housing or casing.

Now according to an important aspect of this invention a substantially non-deformable, yet elastic, dome-shaped net or screen 18 is arranged directly above container 8, in other words at the lowermost portion of the connection housing or shaft 13. This net or screen 18 is preferably formed of a synthetic fabric and possesses a mesh size of 500 $\mu$ to 3 millimeters. It is here to be understood that net 18 may possess an approximately semi-spherical or paraboloid-shaped configuration or a similar shaped configuration.

As already explained heretofore the above-discussed apparatus serves to produce a fluidized bed and to spray a fluid medium upon the whirling particles of the feed undergoing treatment. If the feed particles are a coarse powder or pulverulent material, then, by moistening and subsequently drying same there can be obtained a granulate which can be exceptionally well further processed. However, if the feed particles already are present in the form of pressed grains then it is possible to apply a coating to such while in a fluidized bed.

The mode of operation of the described apparatus during coating of particles can be considered as follows:

The container 8 is filled with the material or feed to be treated externally of the casing 1 up to the location of the apex or tip of the cone-like projection 8c, in other words filled with agglomerated grains. Then the thus-filled container 8 is introduced into the outer casing 1 in a position exactly beneath the opening 2a and is pressed tightly in sealing fashion against the seal 10 through the action of both cams 19. After the casing 1 has been closed the blower arrangement 11 is placed into operation. This then sucks air out of the confines of the upper compartment 4 through the filter 14 and conveys such through the exhaust pipe 12 into the surrounding atmosphere or possibly into a heat exchanger or into the non-visible air inlet opening provided at the lower compartment 3 of the housing 1. Owing to the drop in pressure which prevails at the upper chamber or compartment 4 a forceful air current flows upwardly through the apertured or perforated floor 8b of the container 8, this air current entraining the grains which are present within the container 8 and thus producing a fluidized bed.

Since, as can be readily observed by referring to the drawing the apertures or perforations 20 at the perforated floor 8b of the container 8 are inclined inwardly away from the vertical the feed undergoing treatment, depending upon the direction of these apertures 20, will be either raised in a direction towards the central axis of the container 8 or raised along a spiral-shaped path of travel about the central container axis. The feed then will drop back into the container 8 at the central region of the equipment where the air current is less intense.

Now with the heretofore known prior art constructions of such type equipment of this nature a great many of the grains will impact against the inner surface of the connection housing or casing 13, oftentimes resulting in damage thereto. Furthermore, it has additionally been found that the fluidized bed is not very stable, in other words quite frequently there can be observed a surge-like operation because a portion of the grains are entrained by the air current to a very high elevation whereas a following portion of such grains only rise to approximately one-half of this height or elevation so that the individual grains are subjected to quite different residence times within the fluidized bed. Thus if liquid is sprayed or atomized by the atomizer or spray nozzles 15 into the fluidized bed not all of the grains will be uniformly coated.

On the other hand, it has been found that with the use of the dome-shaped screen or net 18 all of these drawbacks can be overcome. By virtue of this net 18 the individual particles are elastically caught and entrained so that they cannot impact against the hard inner wall of the connection housing or shaft 13 and otherwise become damaged. Furthermore, the volume of the fluidized bed is limited so that a uniform density of particles is present in the fluidized bed and all particles are approximately subjected to the same path of travel. Furthermore, due to this limiting or confinement of the fluidized bed the particle density of the bed itself is increased, the loss of atomized liquid is smaller and at the same time the treatment times are reduced.

While there is shown and described present preferred embodiments of the invention, it is to be distinctly understood that the invention is not limited thereto but may be otherwise variously embodied and practiced within the scope of the following claims. Accordingly,

What is claimed is:

1. In an apparatus for producing a fluidized bed of particles, for spraying a fluid medium upon the whirling particles, as well as for moistening and subsequently drying granular material, and for also coating particles, the combination of an upwardly tapering container for material undergoing treatment, said container embodying a perforated floor and a substantially central cone-like projection located thereat, said cone-like projection having an apex portion, nozzle means for a fluid medium located at said apex portion, a substantially vertically extending shaft operably associated with the upper end of said container, and a substantially non-deformable, yet elastic, dome-shaped net member arranged over said container at the region of the lower portion of the shaft and the concavity of which confronts said container, said dome-shaped net member having an inner surface substantially smooth and curved for confining the fluidized particles in the immediate vicinity of said nozzle means and for effecting a substantially uniformly distributed fluidized bed by directing the fluidized particles upwardly towards the center and then downwardly in the vicinity of said nozzle means.

2. The apparatus as defined in claim 1, wherein said net member is formed of synthetic fabric.

3. The apparatus as defined in claim 1, wherein said net member possesses a mesh size in a range of 500 $\mu$ to 3 millimeters.

4. The apparatus as defined in claim 1, wherein said net member possesses an approximately semi-spherical configuration.

5. The apparatus as defined in claim 1, wherein said net member possesses a substantially paraboloid-shaped configuration.

* * * * *